United States Patent
Gao et al.

(10) Patent No.: US 11,945,559 B2
(45) Date of Patent: Apr. 2, 2024

(54) METHOD FOR FORECASTING DEMAND LOAD OF HYBRID ELECTRIC SHIP BY MEANS OF WORKING CONDITION

(71) Applicant: Shanghai Maritime University, Shanghai (CN)

(72) Inventors: Diju Gao, Shanghai (CN); Yao Jiang, Shanghai (CN); Wanneng Yu, Shanghai (CN)

(*) Notice: Subject to any disclaimer, the term of this patent is extended or adjusted under 35 U.S.C. 154(b) by 366 days.

(21) Appl. No.: 17/366,431

(22) Filed: Jul. 2, 2021

(65) Prior Publication Data

US 2022/0097809 A1    Mar. 31, 2022

(30) Foreign Application Priority Data

May 22, 2020   (CN) .......................... 202010444005.9

(51) Int. Cl.
B63B 79/20     (2020.01)
G06N 3/04      (2023.01)

(52) U.S. Cl.
CPC .............. B63B 79/20 (2020.01); G06N 3/04 (2013.01)

(58) Field of Classification Search
CPC .......... B63B 79/20; B63B 79/40; G06N 3/04; G06N 20/10; G06N 3/126; G06N 7/01; G06N 3/045; B63H 2021/202; Y02T 70/5236; G06F 30/15; G06F 30/20
See application file for complete search history.

(56) References Cited

U.S. PATENT DOCUMENTS

| 8,566,266 B2 | 10/2013 | Zhang et al. | |
| 8,924,035 B2 | 12/2014 | Greene et al. | |
| 2022/0242390 A1* | 8/2022 | Li ......................... | B60W 10/06 |

FOREIGN PATENT DOCUMENTS

| CN | 104836259 A | 8/2015 |
| CN | 106779135 A | 5/2017 |
| CN | 110532613 A | 12/2019 |

OTHER PUBLICATIONS

Madasu et al., Load Forecasting Using Hybrid Models, IEEE Transactions on Power Systems, vol. 26, Issue: 1, Feb. 2011, pp. 20-29 (Year: 2011).*
Hasan et al. Using Artificial Neural Network Techniques for Prediction of Electric Energy Consumption, arXiv, Dec. 6, 2014, pp. 1-10 (Year: 2014).*

* cited by examiner

*Primary Examiner* — Sze-Hon Kong
(74) *Attorney, Agent, or Firm* — Lei Jiang LLC; Lei Jiang (57) ABSTRACT

The disclosed is a method for forecasting a demand load during navigation of a ship based on working condition classification. The method of the disclosure comprises: training historical data values by employing a least squares support vector machine to obtain a classification plane, classifying working conditions during the navigation into a fast-changing working condition and a stable working condition, and determining in real time a working condition type of the ship in an online stage. A method for forecasting a demand load by means of a Markov chain is employed for the stable working condition, and a method for forecasting a demand load by means of a radial basis function neural network optimized by a genetic algorithm is employed for the fast-changing working condition. A desirable forecasting effect can be achieved by selecting forecast models suitable for either type of working condition.

3 Claims, 7 Drawing Sheets

METHOD FOR FORECASTING DEMAND LOAD OF HYBRID ELECTRIC SHIP BY MEANS OF WORKING CONDITION

CROSS-REFERENCE TO RELATED APPLICATIONS

The subject application claims priority of the Chinese invention application CN111597640A filed on May 22, 2020 in China. The contents and subject matter thereof are incorporated herein by reference.

FIELD OF INVENTION

The present disclosure relates to a method for forecasting a demand load of a hybrid ship, in particular to a forecasting method based on working condition classification during navigation of a hybrid electric ship.

BACKGROUND ART

An all-electric ship, which is powered by batteries, is currently one of the main solutions to the problems of waters pollution and fossil energy. However, as the battery technology still has the problems of poor performance, small capacity and the like, a hybrid electric ship has become a good option for the transition period. How to efficiently and reasonably distribute the energy sources for the different working conditions of a ship during its navigation is one of the important issues of a hybrid electric ship to save energy and improve safety for the ship.

At present, most of energy management strategies of hybrid electric ships are based on known demand loads, which will cause failures of the strategies due to uncertain factors that occur in actual navigation, and the management strategies are difficult to apply to actual projects, so that accurately forecasting a ship demand load has become the core of the implementation of an energy optimization strategy of a hybrid power system.

At present, experts worldwide have conducted researches on ship demand load forecast, in which the most common forecasting methods include a time series method, a neural network method, and a support vector machine. The time series method involves a cumbersome process of selecting the embedding dimension and time delay in a phase space, and the other methods have the drawbacks of a large amount of required data, a slow training speed, and limited forecast accuracy. Therefore, such methods are not suitable for real-time problems that require high forecast accuracy, such as the ship demand load forecast and the like.

SUMMARY OF THE INVENTION

In view of the above problems, the present disclosure proposes a method for forecasting a demand load of a hybrid electric ship based on various working conditions. First, a least squares support vector machine (LS-SVM) classifier is employed to online classify working conditions of the ship during navigation. For the different types of working conditions, a Markov chain forecasting method and a radial basis function neural network method optimized by a genetic algorithm are respectively employed to predict a future demand load to improve the prediction accuracy and lay a foundation for allocation optimization of an energy management system of the hybrid electric ship.

The object of the present disclosure is achieved by the following technical solution:

A forecasting method based on working condition classification of the present disclosure employing a least squares support vector machine (LS-SVM) to calculate a classification plane between different training samples, creating the classification plane from the historical data of the ship, and then implementing real-time classification, comprises the following specific steps:

Step I. Obtain demand loads $b_i$, at time instants i=1, 2, 3, ..., n for a fixed navigation route of the hybrid electric ship, with a sampling period of one sampling time interval and n being equal to the number of historical data.

Step II. for the time instant i, calculate the following four characteristic parameters: average power ratio $$AvgPr_i = \frac{b_{i-1} + b_{i-2} + b_{i-3} + b_{i-4} + b_{i-5}}{5},$$

maximum power ratio Max $Pr_i$=max($b_{i-1},b_{i-2},b_{i-3},b_{i-4},b_{i-5}$), minimum power ratio Min $Pr_i$=min($b_{i-1},b_{i-2},b_{i-3},b_{i-4},b_{i-5}$) and variance of power ratio $$PrVar_i = \frac{\sum_{i=i-1}^{i-5}(b_i - AvgPr_i)}{5},$$

$AvgPr_i$ represents the overall trend of demand load in i−1 to i−5, Max $Pr_i$ represents the fluctuation amplitude in i−1 to i−5, Min $Pr_i$ represents the degree of stability up in i−1 to i−5, and Pr $Var_i$ represents the overall fluctuation from i−1 to i−5;

Step III. Establish the classification model of working conditions, employing a radial basis function as a kernel function of an LS-SVM algorithm: take $x_i$=[Avg $Pr_i$, Max $Pr_i$, Min $Pr_i$, Pr $Var_i$] as input $x_i$, and take the working condition type of the hybrid electric ship as output $y_i$, to obtain the following constrained optimization equation for a classification plane of work condition:

$$\min J(w, b, e_i) = \frac{1}{2}w^T w + \frac{\gamma}{2}\sum_{i=1}^{n} e_i^2, \quad i = 1, 2, 3, ..., n; \quad (1)$$
$$\text{subject to: } y_i[w^T \cdot \varphi(x_i) + b] = 1 - e_i$$

wherein w denotes a weight coefficient vector, n denotes the number of samples, γ denotes a penalty coefficient representing a tolerance to a misclassified sample, $e_i$ denotes an error at an ith sample point, φ(x) denotes a kernel function, b denotes an offset, and $y_i$ denotes a working condition type. Solve the above constrained optimization equation by Lagrange multiplier method to obtain:

$$L(w, b, e_i, a_i) = \frac{1}{2}\|w\|^2 + \frac{\gamma}{2}\sum_{i=1}^{n}e_i^2 - \sum_{i=1}^{n}a_i\{y_i((w^T \cdot \varphi(x_i)) + b) - 1 + e_i\}; \quad (2)$$

wherein $a_i$ is a Lagrange multiplier corresponding to the samples. Take partial derivatives of the Lagrange function L(w, b, $e_i$, $a_i$) respective to w, b, e, and a, respectively, and equate the derivatives to 0 according to KKT condition to obtain:

$$\begin{cases} \frac{\partial L}{\partial w} = 0 \to w = \sum_{i=1}^{n} a_i y_i \varphi(x_i) \\ \frac{\partial L}{\partial b} = 0 \to \sum_{i=1}^{n} a_i y_i = 0 \\ \frac{\partial L}{\partial e_i} = 0 \to a_i = \gamma e_i \\ \frac{\partial L}{\partial a_i} = 0 \to y_i [w^T \varphi(x_i) + b] - e_i = 0 \end{cases}, i = 1, 2, 3, \ldots, n; \quad (3)$$

Transform expression (3) to the following matrix equation:

$$\begin{pmatrix} 0 & y^T \\ y & \Omega + \gamma^{-1} \cdot I \end{pmatrix} \begin{pmatrix} b \\ a \end{pmatrix} = \begin{pmatrix} 0 \\ 1 \end{pmatrix}; \quad (4)$$

wherein $y=[y_1, y_2, \ldots, y_n]^T$, $a=[a_1, a_2, \ldots, a_n]^T$ and $\Omega = y_i y_j \varphi(x_i)^T \varphi(x_j)$, $i, j=1, 2, 3, \ldots, n$.
Solve equation (4) to obtain a and b, and obtain a classification plane as $$d(x_{i,j}) = \text{sgn}(y(x_{i,j})) = \text{sgn}\left(\sum_{i=1,j=1}^{n} a_i y_i \varphi(x_i)^T \varphi(x_i) + b\right).$$

Step IV. Divide the demand loads into t intervals equally from 0 to the maximum of the demand loads, regard each interval as a demand load state, and express the state sets as $E=(E_1, E_2, E_3, \ldots, E_t)$, with $E_l=[a_{l1}, a_{l2}]$, $l=1, 2, 3, \ldots, t$, wherein $a_{l1}$ represents the lower bound of the lth state and $a_{l2}$ represents the upper bound of the lth state.

Step V. Establish the Markov prediction model, and construct a state transition matrix $G_M$ of the demand loads to predict a state of a future demand load: denote a demand load state at a current time instant as $E_l$ and a demand load state at another time instant as $E_o$, wherein $o=1, 2, 3, \ldots, t$. Denote the number of transition of the demand load state from $E_l$ to $E_o$ as $m_{l,o}$, denote the sum of all the numbers of transition of the demand load state $E_l$ as $m_p$, and calculate the number of transition from the state $E_l$ to $E_o$ by means of maximum likelihood estimation:

$$P_{l,o} = \frac{m_{l,o}}{m_p}; \quad (5)$$

to obtain $$G_M = \begin{pmatrix} P_{1,1} & \cdots & \cdots & P_{1,t} \\ \vdots & \ddots & & \vdots \\ \vdots & & \ddots & \vdots \\ P_{t,1} & \cdots & \cdots & P_{t,t} \end{pmatrix}; \quad (6)$$

wherein the transition of the demand load state from $E_l$ to $E_o$ implicates that there exists $b_k$ and $b_{k+1}$ such that $b_k \in E_l$ and $b_{k+1} \in E_o$.

Step VI. Construct a three-layer forward radial basis function neural network, composed of an input layer, a hidden layer and an output layer; employ Gaussian function as kernel function of the radial basis function network in the hidden layer; the number of neurons in the hidden layer v is determined by the maximum matrix element method, and its neurons are expressed as:

$$R_l = \exp\left(\frac{\|M - c_l\|^2}{-2\sigma_l^2}\right), l = 1, 2, 3, \ldots, v; \quad (7)$$

wherein, M is an input vector, $M=(xx_1, xx_2, \ldots, xx_v)$, $xx_q=[xa_q, xb_q, xc_q]$, $q=1, 2, 3, \ldots, v$, $xa_q$ represents motor speed, $xb_q$ represents set torque, and $xc_q$ represents actual torque and these three variables are obtained from the historical navigation data as the training input and the demand loads as the training output; $\sigma_l$ is the width of the lth hidden layer gaussian function, $c_l=(c_{l1}, c_{l2}, \ldots, c_{lN})$ is a center vector of the lth Gaussian function in the hidden layer, and $R_l$ is an output of the lth hidden layer neuron.

Employ genetic algorithm to obtain the optimal parameters of an RBF neural network: Firstly, construct each individual by means of binary coding to consist of the center vector $c_l$, the width $\sigma_l$ and a connection weight between the hidden layer and the output layer $w_{ls}$, with a population size T being equal to the number of samples of the demand loads from historical navigation data. Initiate the T individuals with random values, and set the current number of iterations as $T_{iteration}=0$; then perform selection, crossover and mutation; select individuals by employing a roulette algorithm, the probability of each individual being selected and passed on to the next generation is:

$$B_e = f_e \bigg/ \sum_{e=1}^{T} f_e,$$

the population size is T, the individual fitness value is $f_e$, and the fitness function is defined as follows:

$$f_e = \frac{1}{J} = \frac{1}{(d_e - z_e)^2}, e = 1, 2, 3, \ldots, T; \quad (8)$$

wherein $z_e$ is the value from the current network output layer and $d_e$ the corresponding historical demand load value.

Employ a single-point crossover operator for crossover; in the selection operation optionally select two individuals to be crossed over, and set a crossover probability $P_c=0.8$; and perform simple mutation, that is, perform bit inversion on the binary code on the new individual generated subsequent to the crossover with a mutation probability $P_m$, thereby generate a new individual, wherein $P_m$ is set to 0.008. Increase the current number of iterations by one: $T_{iteration}=T_{iteration}+1$; continue iteration of crossover operation, selection operation, and simple mutation, until one of the stop conditions in the following expression (9) is reached:

$$\begin{cases} T_{iteration} > T_{max} \\ \dfrac{\sum_{e=1}^{T_{iteration}} (d_e - d_{avg})^2}{T_{iteration}} < \varepsilon \end{cases}; \quad (9)$$

wherein $T_{max}$ is a maximum iteration number, and $$d_{avg} = \frac{\sum_{e=1}^{T_{iteration}} d_e}{T_{iteration}},$$

$\varepsilon$ is a threshold of positive value.

Upon termination of the iteration, an optimal neural network with the center value $c_l$, the width $\sigma_l$, and the connection weight between the hidden layer and the output layer $w_{ls}$ is obtained.

Step VII. For a time instant i in actual navigation, calculate the four characteristic parameters obtained according to the demand loads at the time instants i−1, i−2, i−3, i−4, i−5; input the four characteristic parameters into the classification plane $d(x_{i,j})$ to obtain the working condition type as either a fast-changing working condition or a stable working condition; for the stable working condition, proceed to Step VIII, and for the fast-changing working condition, proceed to Step IX.

Step VIII. For the time instant i, obtain the demand load state $E_{k1}$ from Step IV, such that $b_i \in E_{k1}$;

obtain k2, such that the number on row k1 and column k2 of the state transition matrix $G_M$ is not less than any other number on row k1 of the state transition matrix $G_M$; denote $E_{k2}$ as $[a_{l1}, a_{l2}]$, then take the mid-point in $[a_{l1}, a_{l2}]$ as a predicted demand load for the time instant i+1;

obtain k3, such that the number on row k2 and column k3 of the state transition matrix $G_M$ is not less than any other number on row k2 of the state transition matrix $G_M$; denote $E_{k3}$ as $[a_{l3}, a_{l4}]$, then take the mid-point in $[a_{l3}, a_{l4}]$ as a predicted demand load for the time instant i+2;

obtain k4, such that the number on row k3 and column k4 of the state transition matrix $G_M$ is not less than any other number on row k3 of the state transition matrix $G_M$; denote $E_{k4}$ as $[a_{l5}, a_{l6}]$, then take the mid-point in $[a_{l5}, a_{l6}]$ as a predicted demand load for the time instant i+3; proceed to Step VII.

Step IX. Calculate the demand loads under fast changing conditions: employ the optimal neural network in Step VI with the connection weight $w_{ls}$ to obtain predicted demand loads in 3 time instants subsequent to i as:

$$yy_s = \sum_{l=1}^{v} w_{ls} R_l, \ s = 1, 2, 3; \quad (10)$$

proceed to Step VII.

Advantages of the present disclosure:
1. The present disclosure implements demand load forecasts for the stable working condition, as well as for the fast-changing working condition. The present disclosure firstly obtains the working condition types on basis of the LS-SVM, and then performs forecast by employing demand load characteristics under the respective working conditions.
2. While satisfying the real-time requirement of actual projects, the present disclosure implements classification-based forecast with improved forecast accuracy compared with single-model forecast of the prior-art.
3. The present disclosure employs the Markov chain model to perform forecast under the stable working condition, which has the characteristics of a simple structure and fast calculation.
4. The present disclosure employs the RBF neural network optimized by the genetic algorithm, so that the sudden increase and decrease during navigation of the ship can be comfortably managed.

EMBODIMENTS

Figure 1:
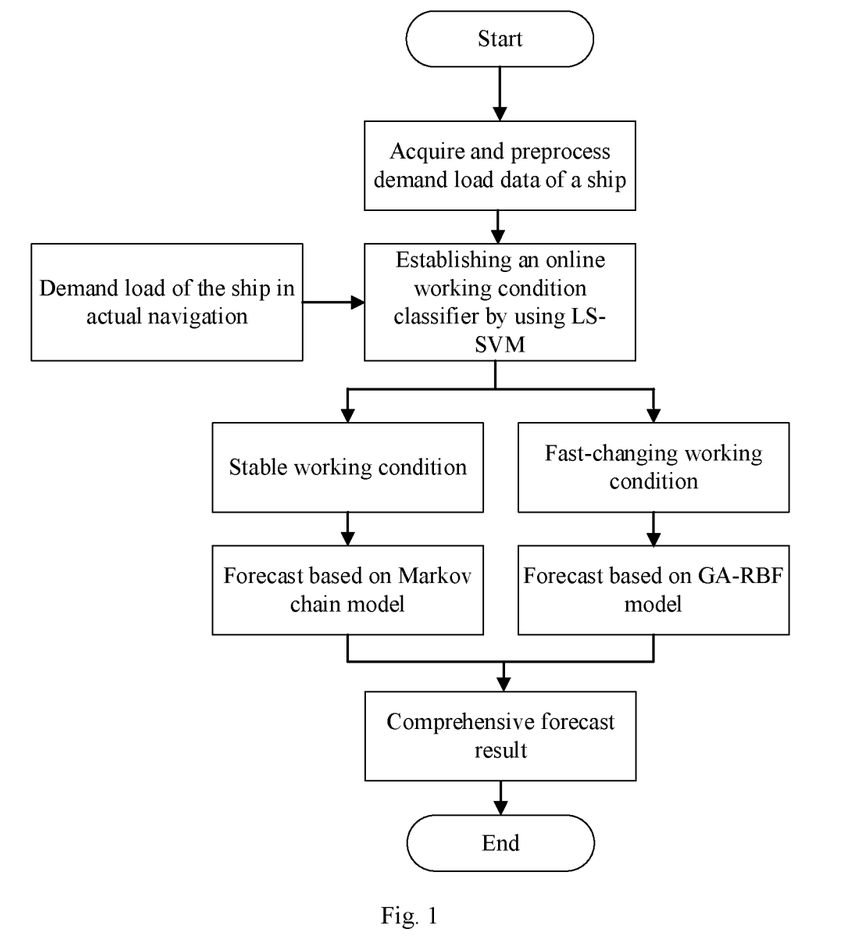
FIG. 1 is an overall flow diagram of the method for forecasting a demand load of a hybrid electric ship based on working condition classification of the present disclosure.
Figure 2:
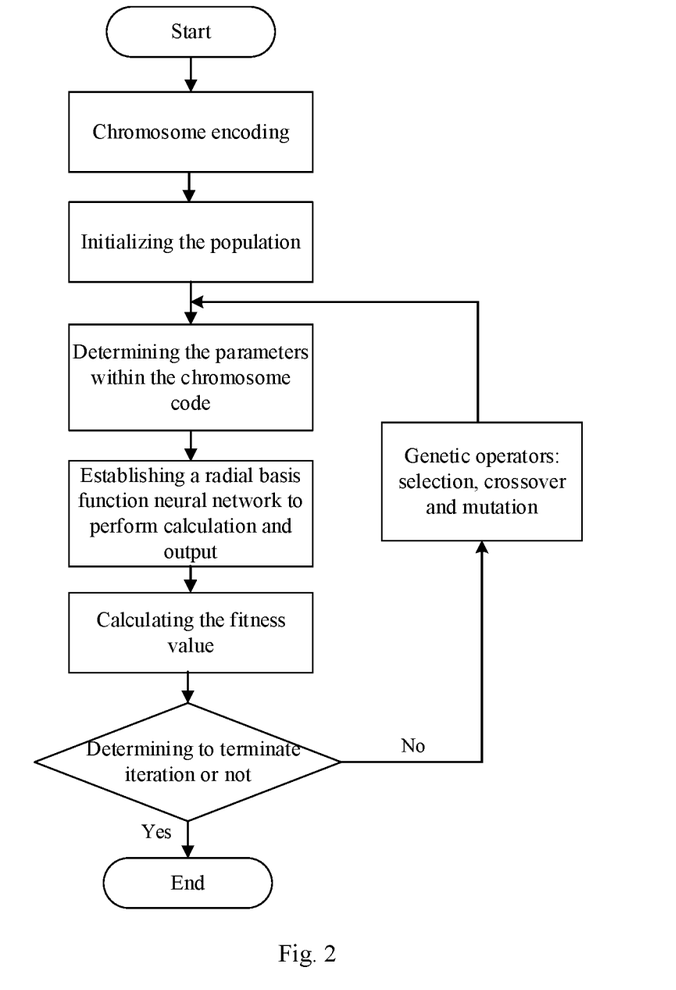
FIG. 2 is a flow chart of the genetic algorithm-radial basis function (GA-RBF) neural network for the hybrid electric ship of the present disclosure under the fast-changing working condition.
Figure 3:
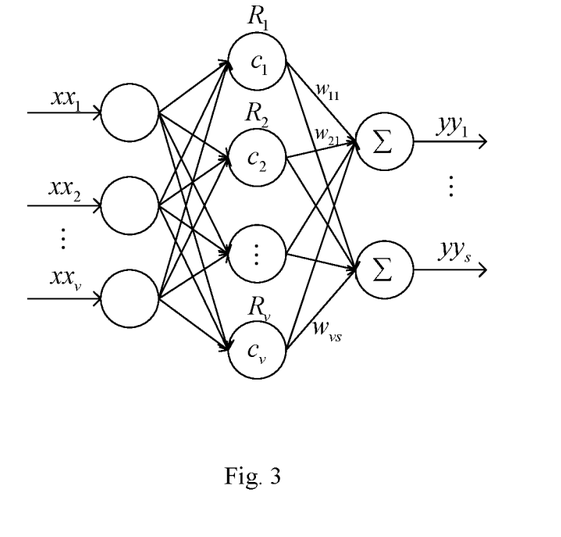
FIG. 3 is a schematic structural diagram of the radial basis function neural network employed in the present disclosure.
Figure 4:
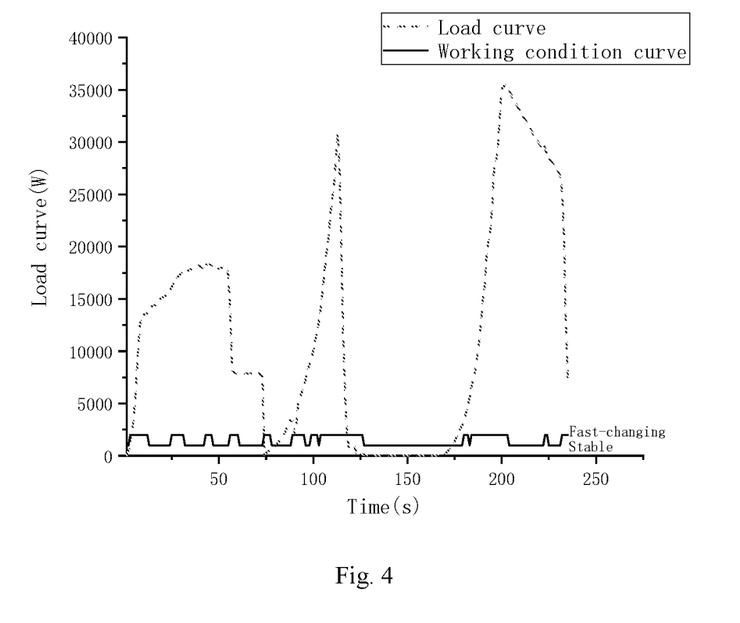
FIG. 4 is a diagram showing the working conditions as predicted online by the least squares support vector machine of the present disclosure.

The present disclosure will be described in detail by describing a preferred embodiment with reference to FIGS. 1 to 2 of the present disclosure.

Step I. Obtain demand loads $b_i$, at time instants i=1, 2, 3, ..., n for a fixed navigation route of the hybrid electric ship, with a sampling period of one sampling time interval and n being equal to the number of historical data. It should be noted herein that natural numbers are chosen herein to represent time instants for the sake of convenience. Thus, one second or 5 seconds might have elapsed from say time instant 2 to time instant 3 depending on whether the sampling time interval is one second or 5 seconds.

For convenience, a deviation standardization method can be employed to carry out data normalization, such that the demand load values are each mapped between 0 and 1, with a conversion relationship as follows:

$$P^* = \frac{P_i - P_{min}}{P_{max} - P_{min}}; \quad (20)$$

In the above equation, P* is a normalized load power, $P_i$ is the load power sample at time instant i, $P_{max}$ is the maximum value in the power samples, and $P_{min}$ is the minimum value in the power samples.

The present disclosure classifies the working conditions as a stable working condition or a fast-changing working condition offline by employing a least squares support vector machine (LS-SVM) algorithm, and accordingly, a Markov chain will be employed for the stable working condition forecast and GA-RBF neural network will be employed for the fast-changing working condition forecast, so as to achieve a good forecast result in either case by taking advantages of the respective methods.

The main difference between the different working conditions lies in the fluctuation magnitude of the demand load. Therefore, to distinguish the stable working condition from the fast-changing working condition, characteristic parameters in Table 1 are employed to characterize the two working conditions.

TABLE 1

Characteristic parameters

| No. | Working condition characteristic parameters |
|---|---|
| 1 | Average power ratio (w/s) |
| 2 | Maximum power ratio (w/s) |
| 3 | Minimum power ratio (w/s) |
| 4 | power ratio variance (w/s) |

Step II. In the training sample set, if the current time is i, the demand loads at i−1, i−2, i−3, i−4, i−5 are respectively converted into the following four characteristic parameters: average power ratio (Avg $Pr_i$), maximum power ratio (Max $Pr_i$), minimum power ratio (Min $Pr_i$) and variance of power ratio (Pr $Var_i$). Wherein, Avg $Pr_i$ represents the overall trend of the demand load from i−1 to i−5, Max $Pr_i$ represents the fluctuation amplitude from i−1 to i−5, Min $Pr_i$ represents the degree of stability from i−1 to i−5, and Pr $Var_i$ represents the overall fluctuation from i−1 to i−5.

Step III. Establish the classification model of working conditions, employing a radial basis function as a kernel function of an LS-SVM algorithm: take $x_i$=[Avg $Pr_i$, Max $Pr_i$, Min $Pr_i$, Pr $Var_i$] as input $x_i$, and take working condition type of the hybrid electric ship as output $y_i$, to obtain the following constrained optimization equation for a classification plane of work condition:

$$\min J(w, b, e_i) = \frac{1}{2} w^T w + \frac{\gamma}{2} \sum_{i=1}^{n} e_i^2, \, i = 1, 2, 3, \ldots, n; \quad (1)$$
$$\text{subject to: } y_i[w^T \cdot \varphi(x_i) + b] = 1 - e_i$$

wherein w denotes a weight coefficient vector, n denotes the number of samples, γ denotes a penalty coefficient representing a tolerance to a misclassified sample, $e_i$ denotes an error at time instant i, $\varphi(x)$ denotes a kernel function, b denotes an offset, and $y_i$ denotes a working condition type. Solve the above constrained optimization equation by Lagrange multiplier method to obtain:

$$L(w, b, e_i, a_i) = \frac{1}{2} \|w\|^2 + \frac{\gamma}{2} \sum_{i=1}^{n} e_i^2 - \sum_{i=1}^{n} a_i\{y_i((w^T \cdot \varphi(x_i)) + b) - 1 + e_i\}; \quad (2)$$

wherein $a_i$ is a Lagrange multiplier corresponding to the sample.

Take partial derivatives of the Lagrange function L(w, b, $e_i$, $a_i$) respective to w, b, $e_i$ and $a_i$ respectively, and equate the derivatives to 0 according to KKT condition to obtain:

$$\begin{cases} \frac{\partial L}{\partial w} = 0 \to w = \sum_{i=1}^{n} a_i y_i \varphi(x_i) \\ \frac{\partial L}{\partial b} = 0 \to \sum_{i=1}^{n} a_i y_i = 0 \\ \frac{\partial L}{\partial e_i} = 0 \to a_i = \gamma e_i \\ \frac{\partial L}{\partial a_i} = 0 \to y_i[w^T \varphi(x_i) + b] - e_i = 0 \end{cases}, i = 1, 2, 3, \ldots, n; \quad (3)$$

Transform equation (3) to the following matrix equation:

$$\begin{pmatrix} 0 & y^T \\ y & \Omega + \gamma^{-1} \cdot I \end{pmatrix} \cdot \begin{pmatrix} b \\ a \end{pmatrix} = \begin{pmatrix} 0 \\ 1 \end{pmatrix}; \quad (4)$$

wherein y=[$y_1$, $y_2$, ..., $y_n$]$^T$, a=[$a_1$, $a_2$, ..., $a_n$]$^T$ and $\Omega$=$y_i y_j \varphi(x_i)^T \varphi(x_j)$, i, j=1, 2, 3, ..., n. Solve equation (4) to obtain a and b, and obtain a classification plane as $$d(x_{i,j}) = \text{sgn}(y(x_{i,j})) = \text{sgn}\left(\sum_{i=1,j=1}^{n} a_i y_i \varphi(x_i)^T \varphi(x_j) + b\right).$$

Step IV. Divide the demand loads into t intervals equally from 0 to the maximum of the demand loads, regard each interval as a demand load state, and express the demand load states as E=($E_1$, $E_2$, $E_3$, ..., $E_t$), with $E_l$=[$a_{l1}$,$a_{l2}$] l=1, 2, 3, ..., t, wherein $a_{l1}$ represents the lower bound of the lth state and $a_{l2}$ represents the upper bound of the lth state.

Step V. Establish the Markov prediction model, and construct a state transition matrix $G_M$ of the demand load to predict a state of a future demand load: denote a demand load state at a current time instant as $E_l$ and a demand load state at another time instant as $E_o$, o=1, 2, 3, ... t, denote the number of transition of the demand load state from $E_l$ to $E_o$ as $m_{l,o}$, denote the sum of all the numbers of transition of the demand load state $E_l$ as $m_p$, and calculate the number of transition from the state $E_l$ to $E_o$ by means of maximum likelihood estimation:

$$P_{l,o} = \frac{m_{l,o}}{m_p}; \quad (5)$$

to obtain $$G_M = \begin{pmatrix} P_{1,1} & \cdots & \cdots & P_{1,t} \\ \vdots & \ddots & & \vdots \\ \vdots & & \ddots & \vdots \\ P_{t,1} & \cdots & \cdots & P_{t,t} \end{pmatrix}; \quad (6)$$

wherein the transition of the demand load state from $E_l$ to $E_o$ implicates that there exists $b_k$ and $b_{k+1}$ such that $b_k \in E_l$ and $b_{k+1} \in E_o$.

Step VI. Construct a three-layer forward radial basis function neural network, composed of an input layer, a hidden layer and an output layer. Employ Gaussian function as kernel function of the radial basis function network in the hidden layer; the number of neurons in the hidden layer v is determined by the maximum matrix element method, and the neurons are expressed as:

$$R_l = \exp\left(\frac{\|M - c_l\|^2}{-2\sigma_l^2}\right), l = 1, 2, 3, \ldots, v; \quad (7)$$

wherein, M is an input vector, $M=(xx_1, xx_2, \ldots, xx_v)$, $xx_q=[xa_q, xb_q, xc_q]$, $q=1, 2, 3, \ldots, v$, $xa_q$ represents motor speed, $xb_q$ represents set torque, and $xc_q$ represents actual torque and these three variables are obtained from the historical navigation data as the training input and the demand loads as the training output; $\sigma_l$ is the width of the lth hidden layer Gaussian function, $c_l=(c_{l1}, c_{l2}, \ldots, c_{lN})$ is a center vector of the lth Gaussian function in the hidden layer, $R_l$ is an output of the lth hidden layer neuron.

Employ Genetic algorithm to obtain the optimal parameters of an RBF neural network: Firstly, construct each individual by means of binary coding to consist of the center vector $c_l$, the width $\sigma_l$ and a connection weight between the hidden layer and the output layer $w_{ls}$, with a population size T being equal to the number of samples of the demand loads from the historical navigation data; initiate the T individuals with random values, and set the current number of iterations as $T_{iteration}=0$; then perform selection, crossover and mutation; select individuals by employing a roulette algorithm, the probability of each individual being selected and passed on to the next generation is:

$$B_e = f_e \bigg/ \sum_{e=1}^{T} f_e,$$

the population size is T, the individual fitness value is $f_e$, and the fitness function is defined as follows:

$$f_e = \frac{1}{J} = \frac{1}{(d_e - z_e)^2}, e = 1, 2, 3, \ldots, T; \quad (8)$$

wherein $z_e$ is the value from the current network output layer and $d_e$ the corresponding historical load demand value.

Employ a single-point crossover operator for crossover: in the selection operation optionally select two individuals to be crossed over, and set a crossover probability $P_c=0.8$; and perform simple mutation, that is, perform bit inversion on the binary code on the new individual generated after the crossover with a mutation probability $P_m$, thereby generate a new individual, wherein $P_m$ is set to 0.008; increase the current number of iterations by one: $T_{iteration}=T_{iteration}+1$; continue iteration of crossover operation, selection operation, and simple mutation, until one of stop conditions in the following expression (9) is reached:

$$\begin{cases} T_{iteration} > T_{max} \\ \dfrac{\sum_{e=1}^{T_{iteration}}(d_e - d_{avg})^2}{T_{iteration}} < \varepsilon \end{cases} \quad (9)$$

wherein $T_{max}$ is a maximum iteration number, and $$d_{avg} = \frac{\sum_{e=1}^{T_{iteration}} d_e}{T_{iteration}}, \varepsilon$$

is a threshold of positive value.

Upon termination of the iteration, an optimal neural network with the center value $c_l$, the width $\sigma_l$, and the connection weight between the hidden layer and the output layer $w_{ls}$ is obtained.

Step VII. For a time instant i in actual navigation, calculate the four characteristic parameters obtained according to the demand loads at the time instants i−1, i−2, i−3, i−4, i−5, and take the four characteristic parameters as inputs to the classification plane $d(x_{i,j})$, the current working condition is classified online as a fast-changing working condition or a stable working condition; When the current working condition of the ship is classified as a stable working condition, proceed to Step VIII; and when the current working condition of the ship is classified as a fast-changing working condition, proceed to Step IX.

Step VIII. For the time instant i, obtain the demand load state $E_{k1}$ from Step IV, such that $b_i \in E_{k1}$;

obtain k2, such that the number on row k1 and column k2 of the state transition matrix $G_M$ is not less than any other number on row k1 of the state transition matrix $G_M$; denote $E_{k2}$ as $[a_{l1}, a_{l2}]$, then take the mid-point in $[a_{l1}, a_{l2}]$ as a predicted demand load for the time instant i+1;

obtain k3, such that the number on row k2 and column k3 of the state transition matrix $G_M$ is not less than any other number on row k2 of the state transition matrix $G_M$; denote $E_{k3}$ as $[a_{l3}, a_{l4}]$, then take the mid-point in $[a_{l3}, a_{l4}]$ as a predicted demand load for the time instant i+2;

obtain k4, such that the number on row k3 and column k4 of the state transition matrix $G_M$ is not less than any other number on row k3 of the state transition matrix $G_M$; denote $E_{k4}$ as $[a_{l5}, a_{l6}]$, then take the mid-point in $[a_{l5}, a_{l6}]$ as a predicted demand load for the time instant i+3; proceed to Step VII.

Step IX. Calculate the demand load under fast changing conditions: employ the optimal neural network in Step VI with the connection weight $w_{ls}$ to obtain predicted demand loads in 3 time instants subsequent to i as:

$$yy_s = \sum_{l=1}^{v} w_{ls} R_l, s = 1, 2, 3; \quad (10)$$

proceed to Step VII.

Figure 5:
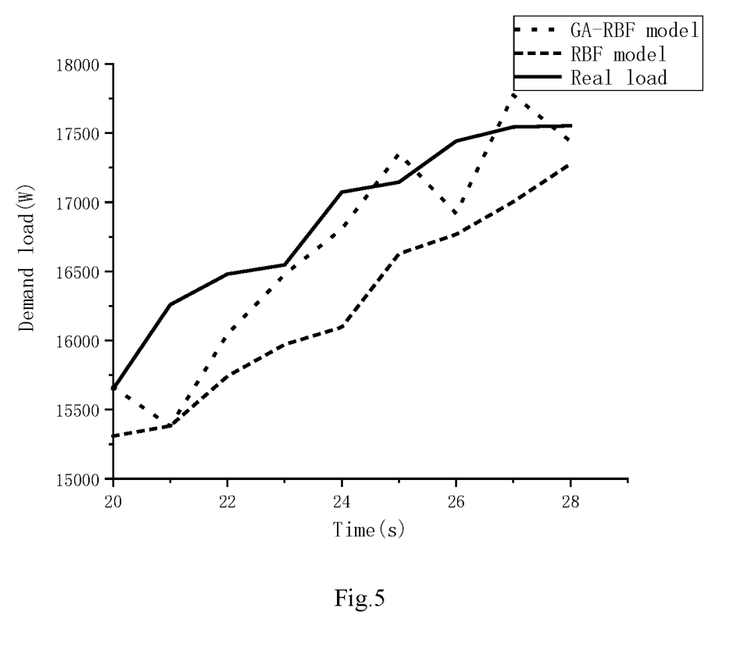
FIG. 5 compares the forecasts as predicted by GA-RBF and by RBF under the fast-changing working condition of the hybrid electric ship of the present disclosure.

To verify that the GA-RBF neural network has a better forecast effect, the GA-RBF and RBF are respectively employed to predict the future demand load under the fast-changing working condition, as shown in FIG. 5.

The optimal radial basis function neural network is obtained to calculate the future demand load with higher accuracy. So far, the load forecast under the fast-changing working condition is completed.

Figure 6:
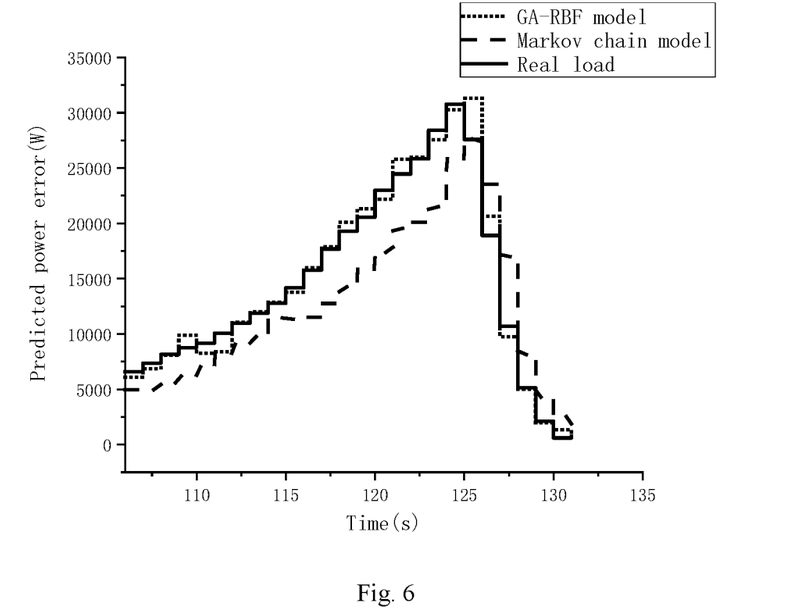
FIG. 6 compares the forecasts as predicted by employing GA-RBF and by employing the Markov chain under the fast-changing working condition of the hybrid electric ship.

To highlight the satisfactory forecast effect of the GA-RBF model under the fast-changing working condition, simulation is performed by MATLAB. FIG. 6 compares forecasts as predicted employing the GA-RBF and the Markov chain under the fast-changing working condition.

Figure 7:
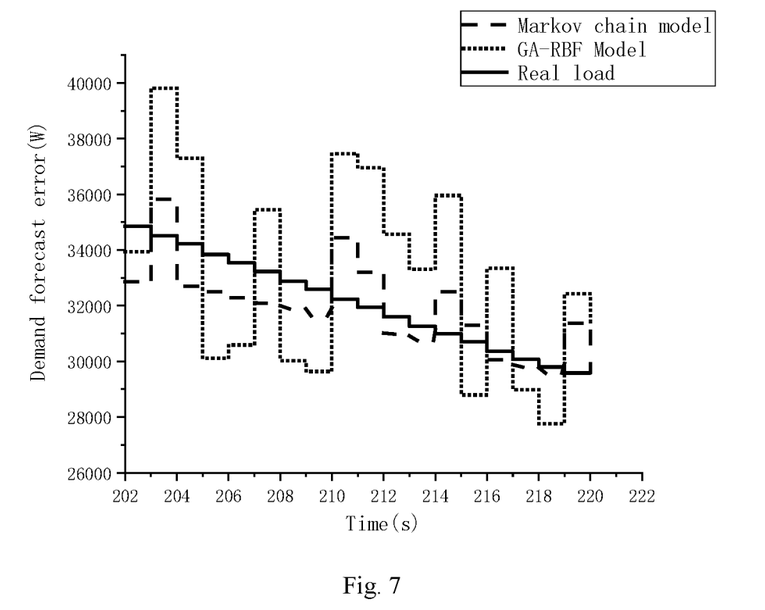
FIG. 7 compares the forecasts as predicted by GA-RBF and by employing the Markov chain under the stable working condition of the hybrid electric ship.

To highlight the satisfactory forecast effect of the Markov chain model under the stable working condition, simulation is performed by MATLAB. FIG. 7 compares forecasts as predicted by employing the GA-RBF and the Markov chain under the stable working condition.

To evaluate the forecast effect by means of data comparison, the root mean square error (RMSE) is introduced as an evaluation index. The RMSE is employed for evaluation by calculating the difference between a sample value and a real value according to the equation below:

$$RMSE = \sqrt{\frac{1}{N}\sum(\hat{p}(i) - p(i))^2} ; \quad (11)$$

In the above equation, N is the number of samples, $\hat{p}(i)$ is the predicted power, and $p(i)$ is the actual power at time instant i respectively.

Under an identical working condition, simulation forecasts predicted employing the Markov chain in the whole process, the GA-RBF model in the whole process, the GA-RBF under the fast-changing working condition, and forecasts employing the Markov chain under the stable working condition are shown in Table 2.

TABLE 2

Comparison results of different forecasting methods

| Forecast model | RMSE (kW) |
| --- | --- |
| Markov chain model | 2.321 |
| GA-RBF model | 1.983 |
| Forecast method proposed herein | 1.536 |

In summary, the present disclosure proposes a method for forecasting a demand load of a hybrid electric ship by means of working condition classification. First, the least squares support vector machine (LS-SVM) algorithm is employed to classify the working conditions as the stable working condition or the fast-changing working condition. For the stable working condition, the Markov chain model suitable for the purpose is employed for forecast, and for the fast-changing working condition, the radial basis function neural network optimized by the genetic algorithm is employed to predict the future demand load. The respective advantages of the two forecast models are made use of to improve the comprehensive forecast effect, which serves as a foundation for allocation optimization of energy management.

Samples for the present invention are collected per sampling time interval of 1-5 seconds, which suffice in most cases. However, a person of the art can adjust the sample interval as is deemed fit and proper. The technical solution of the present invention is tailored to application for a hybrid electric ship. Again, a person of the art can readily adapt the present invention to ships of all sorts as well as to automobiles and aircrafts. It is easily understood that parameters of the technical solution of the present invention need to be adjusted for the adaptation. For example, the aforementioned sample interval should be per milliseconds for unmanned automobiles. For the number t of the intervals of the demand loads, 100-150 is a good choice for a hybrid electric ship. For an aircraft, this number could be in thousands.

Although the present disclosure has been described in detail by employing the above preferred embodiments, it should be recognized that the above description should not be considered as limiting the present disclosure. After those skilled in the art have read the above description, various modifications and substitutions to the present disclosure will be obvious. Thus, the protection scope of the present disclosure shall be defined only by the appended claims.

What is claimed is:

1. A method for forecasting a demand load of a hybrid electric ship by means of working condition classification, comprising the following steps:

Step I. obtaining demand loads $b_i$, at time instants i=1, 2, 3, ..., for a fixed navigation route of the hybrid electric ship, with a sampling period of one sampling time interval, and with n denoting a number of samples of the demand loads collected from historical navigation data;

Step II. for the time instant i, calculating the following four characteristic parameters: average power ratio $$AvgPr_i = \frac{b_{i-1} + b_{i-2} + b_{i-3} + b_{i-4} + b_{i-5}}{5},$$

maximum power ratio Max $Pr_i$=max($b_{i-1}$, $b_{i-2}$, $b_{i-3}$, $b_{i-4}$, $b_{i-5}$), minimum power ratio Min $Pr_i$=min($b_{i-1}$, $b_{i-2}$, $b_{i-3}$, $b_{i-4}$, $b_{i-5}$) and variance of power ratio $$PrVar_i = \sum_{i=i-1}^{i-5} \frac{(b_i - AvgPr_i)}{5};$$

Step III. establishing a classification model for working conditions, employing a radial basis function as a kernel function of an LS-SVM algorithm: taking $x_i$= [Avg $Pr_i$, Max $Pr_i$, Min $Pr_i$, Pr $Var_i$] as input $x_i$, and taking working condition type of the hybrid electric ship as output $y_i$, to obtain the following constrained optimization equation for a classification plane for working conditions:

$$\min J(w, b, e_i) = \frac{1}{2}w^T w + \frac{\gamma}{2}\sum_{i=1}^{n} e_i^2 \quad , i = 1, 2, 3, \ldots ; \quad (1)$$
$$\text{subject to: } y_i\left[w^T \cdot \varphi(x_i) + b\right] = 1 - e_i$$

wherein w denoting a weight coefficient vector, γ denoting a penalty coefficient representing a tolerance to a misclassified sample, $e_i$ denoting an error at an ith sample point, φ(x) denoting a kernel function, b denoting an offset, and $y_i$ denoting a working condition type; solving the above constrained optimization equation by Lagrange multiplier method to obtain:

$$L(w, b, e_i, a_i) = \frac{1}{2}\|w\|^2 + \frac{\gamma}{2}\sum_{i=1}^{n} e_i^2 - \sum_{i=1}^{n} a_i\{y_i((w^T \cdot \varphi(x_i)) + b) - 1 + e_i\}; \quad (2)$$

wherein $a_i$ being a Lagrange multiplier corresponding to the i sample; taking partial derivatives of the Lagrange function L(w, b, $e_i$, $a_i$) respective to w, b, $e_i$ and $a_i$ respectively, and equating the derivatives to 0 according to KKT condition to obtain:

$$\begin{cases} \frac{\partial L}{\partial w} = 0 \to w = \sum_{i=1}^{n} a_i y_i \varphi(x_i) \\ \frac{\partial L}{\partial b} \partial b = 0 \to \sum_{i=1}^{n} a_i y_i = 0 \\ \frac{\partial L}{\partial e_i} = 0 \to a_i = \gamma e_i \\ \frac{\partial L}{\partial a_i} = 0 \to y_i [w^T \varphi(x_i) + b] - e_i = 0 \end{cases}, i = 1, 2, 3, \ldots; \quad (3)$$

transforming expression (3) to the following matrix equation:

$$\begin{pmatrix} 0 & y^T \\ y & \Omega + \gamma^{-1} \cdot I \end{pmatrix} \cdot \begin{pmatrix} b \\ a \end{pmatrix} = \begin{pmatrix} 0 \\ 1 \end{pmatrix}; \quad (4)$$

wherein $y=[y_1, y_2, \ldots,$ $a=[a_1, a_2, \ldots$ and $\Omega = y_i y_j \varphi(x_i)^T \varphi(x_j)$, i, j=1, 2, 3, . . . ; solving equation (4) to obtain a and b, and obtaining a classification plane as $$d(x_{i,j}) = \text{sgn}(y(x_{i,j})) = \text{sgn}\left(\sum_{i=1, j=1}^{n} a_i y_i \varphi(x_i)^T \varphi(x_j) + b\right);$$

Step IV. dividing the demand loads into t intervals equally from 0 to a maximum of the demand loads, regarding each interval as a demand load state, and expressing a demand load state space as $E=(E_1, E_2, E_3, \ldots,$ with $E_l=[a_{l1}, a_{l2}]$, l=1, 2, 3, . . . , wherein $a_{l1}$ representing a lower bound of an lth state and $a_{l2}$ representing an upper bound of the lth state;

Step V. establishing a Markov prediction model, and constructing a state transition matrix $G_M$ of the demand loads to predict a state of a future demand load: denoting the demand load state at a current time instant as $E_l$ and the demand load state at another time instant as $E_o$, wherein o=1, 2, 3, . . . ; denoting a number of transition of the demand load state from $E_l$ to $E_o$ as $m_{l,o}$, denoting a sum of all the numbers of transition of the demand load state $E_l$ as $m_p$, and calculating a number of transition from the state $E_l$ to $E_o$ by means of maximum likelihood estimation:

$$P_{l,o} = \frac{m_{l,o}}{m_p}; \quad (5)$$

to obtain $$G_M = \begin{pmatrix} P_{1,1} & \cdots & \cdots \\ \vdots & \ddots & \vdots \\ \vdots & & \ddots & \vdots \\ P_{t,1} & \cdots & \cdots \end{pmatrix}; \quad (6)$$

wherein the transition of the demand load state from $E_l$ to $E_o$ implicating that there exists $b_k$ and $b_{k+1}$ such that $b_k \in E_l$ and $b_{k+1} \in E_o$;

Step VI. constructing a three-layer forward radial basis function neural network, composed of an input layer, a hidden layer and an output layer, and with the demand loads as training output; employing Gaussian function as kernel function of the radial basis function network in the hidden layer; a number v of neurons in the hidden layer is determined by the maximum matrix element method, with the neurons being expressed as:

$$R_l = \exp\left(\frac{\|M - c_l\|^2}{-2\sigma_l^2}\right), l = 1, 2, 3, \ldots; \quad (7)$$

wherein, M being an input vector, $M=(xx_1, xx_2, \ldots,$ $xx_q=[xa_q, xb_q, xc_q]$, q=1, 2, 3, . . . , $xa_q$ representing motor speed, $xb_q$ representing set torque, and $xc_q$ representing actual torque, with $xa_q$, $xb_q$, and $xc_q$ being obtained from the historical navigation data as training input; $\sigma_l$ being a width of an lth hidden layer Gaussian function, $c_l=(c_{l1}, c_{l2}, \ldots$ being a center vector of the lth Gaussian function in the hidden layer, $R_l$ being an output of an lth neuron in the hidden layer;

employing genetic algorithm to obtain optimal parameters of the neural network: firstly, constructing each individual by means of binary coding to consist of the center vector $c_l$, the width $\sigma_l$ and a connection weight between the hidden layer and the output layer $w_{ls}$, with a population size T being equal to the number of samples of the demand loads from historical navigation data; initiating the T individuals with random values, and setting a current number of iterations $T_{iteration}=0$; then performing selection, crossover and mutation; selecting each individual by employing a roulette algorithm, with probability of each individual e being selected and passed on to a next generation as:

$$B_e = f_e \bigg/ \sum_{e=1}^{T} f_e,$$

with fitness value for $f_e$ being defined as:

$$f_e = \frac{1}{J} = \frac{1}{(d_e - z_e)^2}, e = 1, 2, 3, \ldots; \quad (8)$$

wherein $z_e$ denoting a value in the output layer in the current network corresponding to the individual e and $d_e$ denoting the load demand $b_e$;

employing a single-point crossover operator for crossover operation, conducting selection operation by means of optionally selecting two individuals to be crossed over, and setting a crossover probability $P_c=0.8$; performing simple mutation, that is, performing bit inversion on a binary code of the individual generated subsequent to the crossover operation with a mutation probability $P_m$, thereby generating a new individual, wherein $P_m$ being set to 0.008; increasing the current number of iterations by one; continuing iteration of crossover operation, selection operation, and simple mutation, until one of stop conditions in the following expression (9) is reached:

$$\begin{cases} T_{iteration} > T_{max} \\ \dfrac{\sum_{e=1}^{T_{iteration}} (d_e - d_{avg})^2}{T_{iteration}} < \varepsilon \end{cases}; \quad (9)$$

wherein $T_{max}$ being a maximum iteration number, and $$d_{avg} = \frac{\sum_{e=1}^{T_{iteration}} d_e}{T_{iteration}}, \varepsilon \qquad (5)$$

being a threshold of positive value;

obtaining an optimal neural network with the center value $c_l$, the width $\sigma_l$, and the connection weight between the hidden layer and the output layer $w_{ls}$ upon termination of the iteration;

Step VII. for a time instant i in actual navigation, calculating the four characteristic parameters obtained according to the load value at the instants i−1, i−2, i−3, i−4, i−5; inputting the four characteristic parameters into the classification plane $d(x_{i,j})$ to obtain the working condition type as either a fast-changing working condition or a stable working condition; for the stable working condition, proceeding to Step VIII, and for the fast-changing working condition, proceeding to Step IX;

Step VIII. for the time instant i, obtaining the demand load state $E_{k1}$ from Step IV, such that $b_i \in E_{k1}$;

obtaining k2, such that a number on row k1 and column k2 of the state transition matrix $G_M$ is not less than any other number on row k1 of the state transition matrix $G_M$; denoting $E_{k2}$ as $[a_{l1}, a_{l2}]$, then taking the mid-point in $[a_{l1}, a_{l2}]$ as a predicted demand load for the time instant i+1;

obtaining k3, such that a number on row k2 and column k3 of the state transition matrix $G_M$ is not less than any other number on row k2 of the state transition matrix $G_M$; denoting $E_{k3}$ as $[a_{l3}, a_{l4}]$, then taking the mid-point in $[a_{l3}, a_{l4}]$ as a predicted demand load for the time instant i+2;

obtaining k4, such that a number on row k3 and column k4 of the state transition matrix $G_M$ is not less than any other number on row k3 of the state transition matrix $G_M$; denoting $E_{k4}$ as $[a_{l5}, a_{l6}]$, then taking the mid-point in $[a_{l5}, a_{l6}]$ as a predicted demand load for the time instant i+3;

navigating the ship at the time instants i+1, i+2, and i+3 according to the respective demand loads;

proceeding to Step VII;

Step IX. employing the optimal neural network in Step VI with the connection weight $w_{ls}$ to obtain predicted demand loads in 3 time instants subsequent to i as:

$$yy_s = \sum_{l=1}^{v} w_{ls} R_l, s = 1, 2, 3; \qquad (10)$$

navigating the ship at the time instants i+1, i+2, and i+3 according to the respective demand loads;

proceeding to Step VII.

2. The method for forecasting the demand load of the hybrid electric ship by means of working condition classification of claim 1, wherein the sampling time interval in Step I is 1-5 seconds.

3. The method for forecasting the demand load of the hybrid electric ship by means of working condition classification of claim 1, wherein the threshold $\varepsilon$ in Step VI is less than 10.

* * * * *